(12) United States Patent
Mace

(10) Patent No.: US 6,235,200 B1
(45) Date of Patent: May 22, 2001

(54) METHOD AND APPARATUS FOR CONTROLLING RECHARGING OF WATER CONDITIONING APPARATUS

(75) Inventor: Tim Mace, Haverhill (GB)

(73) Assignee: Waterside PLC, Essex (GB)

( * ) Notice: Subject to any disclaimer, the term of this patent is extended or adjusted under 35 U.S.C. 154(b) by 0 days.

(21) Appl. No.: 09/442,103

(22) Filed: Nov. 16, 1999

Related U.S. Application Data

(63) Continuation of application No. PCT/GB98/01391, filed on May 15, 1998.

(51) Int. Cl.⁷ .................................................. B01D 41/00
(52) U.S. Cl. ........................ 210/662; 210/87; 210/140; 210/143; 210/541; 210/662; 210/670; 210/739
(58) Field of Search ........................... 210/85, 96.1, 138, 210/139, 140, 141, 142, 143, 269, 662, 670, 739, 87, 541

(56) References Cited

U.S. PATENT DOCUMENTS

| | | | |
|---|---|---|---|
| 4,104,158 | 8/1978 | Davis | 210/139 |
| 4,237,538 | * 12/1980 | Le Dall | 210/662 |
| 4,385,357 | * 5/1983 | Davis et al. | 210/662 |
| 4,426,294 | 1/1984 | Seal | 210/662 |
| 4,469,602 | * 9/1984 | Seal | 210/662 |
| 4,470,911 | 9/1984 | Reinke | 210/662 |
| 4,536,845 | 8/1985 | DeVale et al. | 210/662 |
| 4,668,402 | * 5/1987 | North | 210/662 |
| 5,234,601 | 8/1993 | Janke et al. | 210/662 |
| 5,544,072 | * 8/1996 | Zimmerman et al. | 210/140 |
| 5,879,559 | * 3/1999 | Schreiner et al. | 210/662 |

OTHER PUBLICATIONS

International Search Report for PCT/GB98/01391, dated Aug. 20, 1998.

* cited by examiner

*Primary Examiner*—Joseph W. Drodge
(74) *Attorney, Agent, or Firm*—Wolf, Greenfield & Sacks, P.C.

(57) ABSTRACT

A controller and corresponding method have been developed for controlling recharging of a water conditioning apparatus. The apparatus includes an input component for receiving measurements of water usage by the apparatus, a storing component configured to store, for each time slot of a cyclically repeating series of time slots, values dependent upon an average of the measured amounts of usage in that time slot and in at least one other corresponding time slot in a previous cycle, and a determining component configured to determine, at least in part, a time for recharging the apparatus in dependence upon the stored value. The controller also may include a component for determining a parameter from which a requirement to recharge the apparatus can be predicted or utilized in combination with the storing device and a component for determining whether to make a full recharge or a partial recharge of the apparatus in dependence upon a detected or predicted remaining capacity of the apparatus for the current time slot.

15 Claims, 2 Drawing Sheets

METHOD AND APPARATUS FOR CONTROLLING RECHARGING OF WATER CONDITIONING APPARATUS

This is a continuation of International Application Serial No. PCT/GB98/01391, with an International filing date of May 15, 1998.

FIELD OF THE INVENTION

This invention relates to rechargeable water conditioning apparatus (such as a general-purpose water softener, a water softener forming part of some larger apparatus, or a water filter). The invention also relates to a method of controlling recharging of such a water conditioning apparatus and to a recharging controller for such an apparatus.

BACKGROUND OF THE INVENTION

Such water conditioning apparatus is well known. For example, some forms of domestic water softeners employ a tank containing resin beads having a coating of sodium ions. Hard water from a supply such as the water main is passed through the tank, and the sodium ions on the beads are exchanged with calcium and magnesium ions in the water so as to soften the water. Eventually, the resin beads become exhausted of sodium ions, and it is then necessary to recharging, or regenerate, the apparatus. In a known recharging process, there are five phases: (1) water is passed to a tank containing common salt which dissolves to form brine; (2) the brine is passed into the tank of resin beads where it filters through the beads to recharge them by replacing the calcium and magnesium ions with sodium ions; (3) water is passed through the tank of resin beads to wash away any remaining brine; (4) water is passed through the tank of resin beads in the opposite direction to remove any dirt or sediments; and (5) water is forced through the tank of resin beads in the normal direction to pack the resin beads ready to return to service. In order to avoid interrupting the supply of water to the house, during the last four of these phases, the water softener is bypassed so that water can be supplied to the house directly from the water main. Because the supplied water is not then softened, it is desirable that the recharging process takes place during periods of low, or no, water usage. To deal with this, it is known to control the recharging process of the softener by a timer, and the regeneration sequence is initiated at regular intervals, for example in the early morning when water usage might be assumed to be at its lowest.

One problem with this known form of control is that the time set for initiation of the recharging cycle may not necessarily always be a time when water usage is at its lowest. Another problem is that, in the event of power failure, many less expensive designs of timer will require resetting in order to avoid the recharging cycles occurring at the wrong times, possibly unbeknown to the consumer.

Similar issues arise in relation to other water conditioning apparatus, such as water filters. Such filters may need to be periodically recharged by backwashing to remove deposits. While the recharging operation is being carried out, then either the supply of water to the consumer must be cut off, or the consumer must be supplied with unfiltered water.

A first aspect of the present invention is concerned more particularly with a method of controlling recharging of a water conditioning apparatus, comprising the steps of: detecting water usage by the apparatus; storing for each time slot of a cyclically repeating series of such time slots information about the usage in that time slot; and determining, at least in part, a time for recharging the apparatus in dependence upon the stored information. Such a method is hinted at in patent document GB-A-2,177,232, although it is not apparent from that document how, during normal operation, recharging can actually take place once a determination to recharge has been made.

In the method of GB-A-2,177,232, the duration of each time slot is one hour, and the time slots repeat every four weeks. If there has been no water usage in a particular time slot, then that fact is stored. It appears that recharging is supposed to take place once required and at a time when the stored information for the particular time slot indicates zero usage. To deal with the case where there is never zero usage, it appears that the time slot for which there has been minimum usage is also stored, and that recharging can supposedly also take place once required and when the stored minimum usage time slot occurs.

SUMMARY OF THE INVENTION

The method of the first aspect of the present invention is characterised in that the information which is stored for each time slot (for example of 3 hours duration) of the cyclically repeating series of such time slots (for example over a period of one week) is a value dependent. upon an average of the measured amounts of usage in that time slot and in at least one corresponding such time slot in a previous cycle. The storing of an amount of usage for each time slot, rather than a binary value ("usage" or "no usage") opens up many possibilities for improving the method. Also, the use of average values for corresponding time slots makes the method less susceptible to vagaries in the water usage in one particular series of the time slots.

In a preferred example of normal operation, when the value for each time slot is updated, the new value may be calculated as the arithmetic mean of the measured amount during the time slot which has just elapsed and the value stored for that time slot. On the other hand, during initialisation (that is, until the time slots start repeating,) the value stored in each time slot may simply be the measured amount for that time slot.

In addition to determining a time for recharging the apparatus, the method may also determine different types of recharging process (for example a full recharging or a partial recharging) in dependence upon different conditions.

The method may further comprise the step of detecting a parameter from which a requirement to recharge the apparatus can be determined or predicted. For example, the total amount of water used since the previous discharge may be measured, and on the basis of this (and preferably also on a preset indication of the hardness of the water) and a predetermined value, a requirement value can be calculated, having a value of, say, 0% when the apparatus has just been recharged and a value of, say, 100% when it is predicted that the apparatus has no conditioning capacity remaining.

In one example of operation, in the determining step, the current time slot is determined to be such a time for recharging the apparatus if both (a) the stored value for the current time slot is a minimum compared with that for adjacent time slots and (b) the requirement parameter is in a first predetermined requirement range, for example greater than 75%. In this case, a full recharge may be initiated. Thus, a full recharge can be carried out at what can be predicted to be a good time based on historical usage.

In another alternative or additional example of operation, in the determining step, the current time slot is determined to be such a time for recharging the apparatus if both (a) the stored value for the current time slot is the minimum of the stored values for all of the time slots and (b) the requirement parameter is in a second predetermined requirement range, for example greater than 75%. In this case, also, a full recharge may be initiated. Thus, a full recharge can be carried out at what can be predicted to be the best, or a good, time of the week, based on historical usage.

In a further alternative or additional example of operation, in the determining step, the current time slot is determined to be such a time for recharging the apparatus if both (a) the measured water usage for the current time slot is less than a first predetermined usage value or even zero and (b) the requirement parameter is in a third predetermined requirement range, for example less than 90%. In this case, a partial recharge may be initiated. Thus, if the need to recharge the apparatus is becoming critical, despite the options for a full recharge mentioned above, a time of low or zero usage may be chosen for a partial (and therefore temporally short) recharge, irrespective of the historical usage.

In yet a further alternative or additional example of operation, in the determining step, the current time is determined to be such a time for recharging the apparatus if both (a) the measured water usage for the current time slot, or at the current time, is less than a second predetermined value or even zero and (b) the period of time since the previous recharging of the apparatus is more than a first predetermined time period, such as, perhaps, four days. In this case, a partial recharge may be initiated. Thus, if there is little or no water usage, for example because of a holiday, the apparatus can still be periodically recharged.

In yet a further example of operation, the determining step may comprise the steps of: determining a score for the current time slot in dependence upon a predicted remaining capacity of the apparatus for the current time slot and upon the stored value for the current time slot; determining at least one further score for at least one respective subsequent time slot in dependence upon a predicted remaining capacity of the apparatus for that subsequent time slot and the stored value for that subsequent time slot; and determining whether or not to initiate recharging of the apparatus in the current time slot in dependence upon a comparison of the determined scores. This enables a time for recharging to be chosen which draws a balance between the volume of water which is used during recharging (which ideally should be minimised) and the utilisation of the conditioning medium (which ideally should be maximised). It should be noted that the predicted remaining capacity for the or each subsequent time slot can be determined from the predicted remaining capacity for the current time slot, the stored value for the current time slot and the stored value(s) for any time slot(s) between the current time slot and that subsequent time slot. Preferably, such scores are determined for the time slots covering a period of one day. If it is determined to recharge the apparatus, this example of operation may include the step of determining whether to make a full recharge or a partial recharge of the apparatus in dependence upon the predicted remaining capacity for the current time slot and the stored value for the current time slot.

In a preferred example of operation, the stored value for each time slot is dependent upon measured elementary amounts of usage in that time slot and at least one temporally adjacent time slot, each elementary amount being weighted in dependence upon the temporal offset between the time of occurrence of that elementary amount of usage and a predetermined point in time relative to that time slot, such as the temporal mid-point. This can avoid the potential situation of small changes in the time that a large amount of water is regularly used (for example for a bath) having a large effect on the usage pattern.

A second aspect of the invention provides a recharging controller for a water conditioning apparatus, comprising means for performing the method of the first aspect the invention.

A third aspect of the invention provides a water conditioning apparatus having a controller according to the second aspect of the invention.

A specific embodiment of the present invention will now be described, by way of example, with reference to the accompanying drawings, in which:

DETAILED DESCRIPTION OF THE INVENTION

Figure 1:
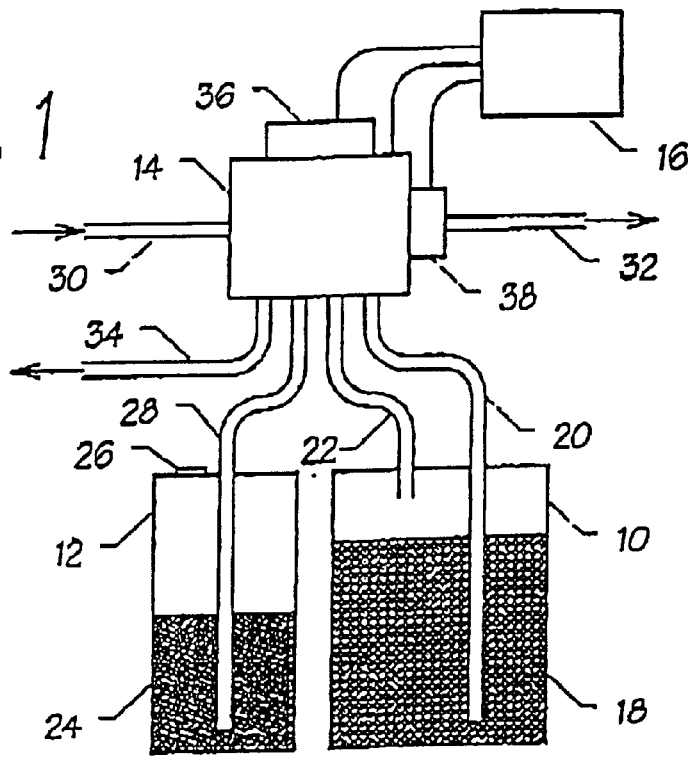
FIG. 1 is a schematic diagram of a water softener and controller therefor forming an embodiment of the invention.

Referring to FIG. 1 of the drawings, the water softener includes a resin tank 10, a salt tank 12, a multi-functional, motorised, metering valve 14 and a controller 16. In a known manner, the resin tank 10 contains a large number of resin beads 18 and has inlet and outlet pipes 20, 22. The resin beads 18 take on a coating of sodium ions when immersed in brine, and then when hard water is passed through the resin beads 18, the sodium ions are exchanged with calcium and/or magnesium ions in the water so as to soften the water. The salt tank 12 contains a consumable supply of common salt (sodium chloride) 24, which can be replaced by the user, as required, through a filler 26.

In the embodiment of the invention, the salt tank 12 is connected to the valve 14 by a pipe 28. The valve 14 is also connected by an inlet pipe 30 to a water supply, such as the water main, by an outlet pipe 32 to the supply to the house, and also has a waste pipe 34. The valve 14 is operated by a DC motor 36 under the control of the controller 16 to cycle around the following six states:

a SERVICE state in which the main inlet pipe 30 is connected to the resin tank inlet pipe 20, and the resin lank outlet pipe 22 is connected to the main outlet pipe 32, so that mains water can be passed through the resin tank and softened;

a FILL state in which the pipe connections of the SERVICE state are maintained and also the salt tank pipe 28 is connected to the main inlet pipe 30 so that the salt tank 12 fills with water to form brine;

a BRINING state, in which the main inlet pipe 30 is connected to the main outlet pipe 32, so that the house is supplied with unsoftened water directly from the main, and in which the salt tank pipe 28 is connected to the resin tank inlet pipe 20, so that the brine can be transferred to the resin tank 10 and filter through the resin beads 18 to recharge them;

a BRINE RINSE state, in which the main inlet pipe 30 continues to be connected to the main outlet pipe 32 to supply unsoftened water directly from the main to the house, and in which the main inlet pipe 30 is also connected to the resin tank inlet pipe 20, and the resin tank outlet pipe 22 is connected to the waste pipe 34, with a restriction provided by the valve 14, so that water is pumped slowly through the resin tank 10 to wash away any remaining brine;

a BACKWASHING state, in which the main inlet pipe 30 continues to be connected to the main outlet pipe 32 to supply unsoftened water directly from the main to the house, and in which the main inlet pipe 30 is also connected to the resin tank outlet pipe 22, and the resin tank inlet pipe 20 is connected to the waste pipe 34 so that water is pumped through the resin tank 10 in the opposite direction to remove any dirt or sediment; and a FAST RINSE state, which is similar to the BRINE RINSE state, except that the restriction is not provided in the valve 14 so that water is forced faster through the resin tank 10 in the normal direction to pack down the resin beads 18 ready for return to the SERVICE state.

The valve member of the valve 14 is provided by a rotatable disc or the like, and an optical sensor is provided to detect the position of the valve member and therefore the state of the valve 14. To do this, the valve member is formed with respective single notches corresponding to the states except the SERVICE state, and a pair of notches corresponding to the SERVICE state so that when the valve 14 is initially operated it can be driven to the SERVICE state, and so that an error can be flagged if the valve 14 reaches the SERVICE state when it should not, or does not reach the SERVICE state when it should. The valve 14 also incorporates a flow meter 38 on the side of the main outlet 32. The flow meter 38 may be provided by a rotary member whose rotation is proportional to the amount of water consumed and on which a magnet is mounted which co-operates with a Hall-effect sensor to produce a pulse with each turn or half-turn of the rotary member. The motor 36, sensor for the valve member 14 and the flow meter 38 are connected by cables to the controller 16.

Figure 2:
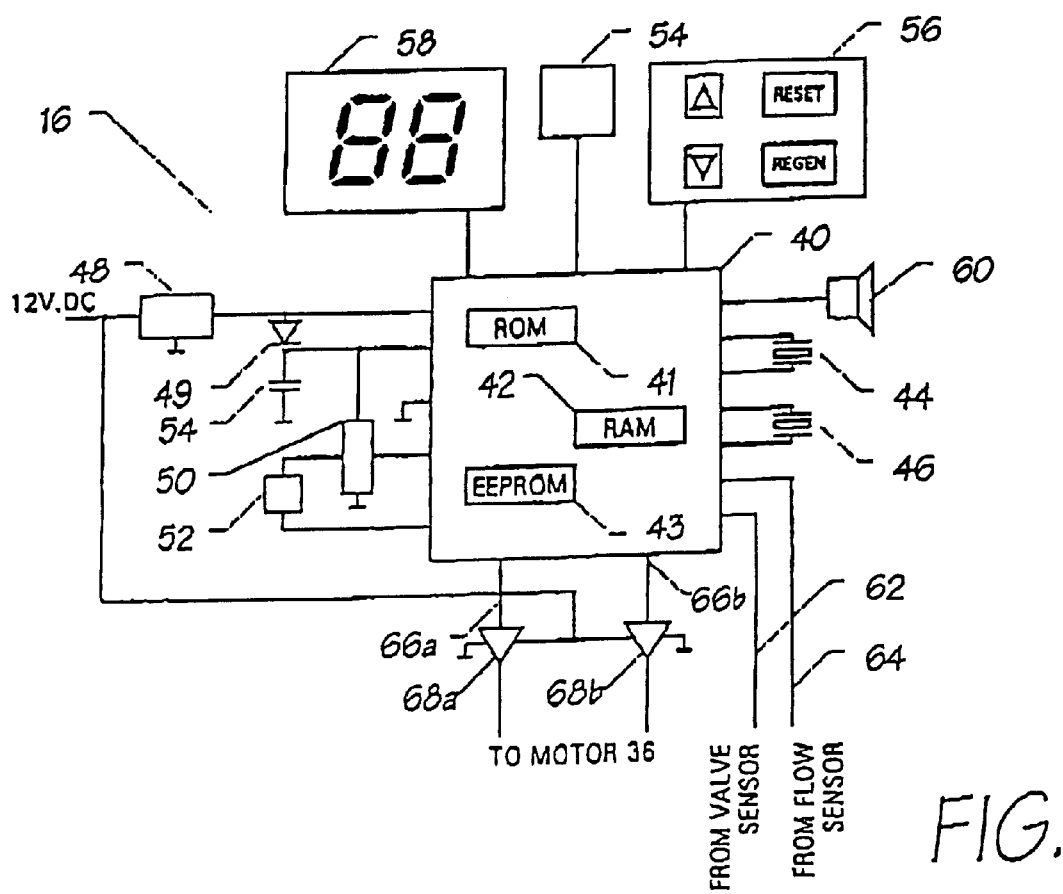
FIG. 2 is a block diagram of the controller of FIG. 1.

Referring now to FIG. 2, the controller 16 is centred around a microcontroller 40, such as an SGS-Thomson ST6245 integrated circuit, which has its own program ROM 41, operating data RAM 42, preset data EEPROM 43, I/O interface, LCD driver, external 2 MHz crystal 44 for normal operation, and external 32 kHz crystal 46 for low-power operation. The microcontroller 16 normally receives power from an external mains-to-12V.DC adaptor. The 12V voltage is supplied to the microcontroller 40 via a 5V voltage regulator 48 and a diode 49. A power-on reset device 50, watchdog timer 52, capacitor 54 and direct connection from the voltage regulator 48 to the microcontroller 40 are provided in a known fashion to deal with initialisation of the microcontroller 40 and powering of the controller 16 in a low power mode in the case of a power cut of up to a few hour's duration. An infra-red link 54 is provided to enable the microcontroller 40 to be programmed. A membrane keypad 56 is provided to enable the user to set the water hardness and to initiate a manual regeneration of the water softener, and to enable an engineer to enter a diagnostic or re-programming mode. A two-character LED display 58 is provided to display basic information on the state of the controller and error information. A piezo sounder 60 provides feedback to the user or engineer on operation of the keypad 56. The microcontroller 40 has an input 62 from the optical sensor for the disc of the valve 14 and also an input 64 from the flow sensor 38. The microcontroller 40 also has a pair of outputs 66a, 66b which are supplied via a pair of 12V tri-state power buffers 68a, 68b to the motor 36 of the valve 14.

The operation of the microcontroller 40 will now be described. The microcontroller 40 provides a relative real-time clock, but without any need for the time to be synchronised to absolute real-time. The microcontroller 40 divides each period of one week into 56 time slots, each having a period of three hours. (In an alternative arrangement which makes more efficient use of the memory of the microcontroller 40, the microcontroller 40 might divide each period of one week into a number of time slots which is equal to or slightly less than a power-of-two and which is preferably divisible by seven so that each day has an integral number of time slots, for example 63 time slots each having a period of 2 hours 40 minutes.) In addition, the microcontroller 40 divides each time slot into a number of equal time divisions, for example sixteen time divisions each having a period of 11¼ minutes. For each time slot, the microcontroller 40 stores in the RAM 42 a value based on historical usage of water, as detected by the water flow sensor 38, from which an expected amount of water usage in that time slot can be predicted. The period of one week is chosen, because it can be expected that for many households the pattern of water usage will be fairly consistent from one week to another.

In operation, the microcontroller 40 counts the pulses arriving from the sensor 38 in the current time slot. In a simple example of operation, each pulse is given equal weight. At the end of the current time slot, the total number of pulses counted during that time slot is averaged (using an arithmetic mean average) with the value previously stored in the RAM 42 for that particular time slot in the week. Since the value previously stored in the RAM 42 was the arithmetic mean average of (a) the number of pulses counted in that time slot in the previous week and (b) the value which was previously stored in the RAM 42 before that, it will be appreciated that after N weeks of operation of the controller 16, if the number of pulses counted for a particular time slot in week i is $P_i$, the value stored in the RAM 42 for that particular time slot will be the sum from i=1 to i=N of $P_i/2^{(N-i+1)}$. In other words, the stored value for each time slot takes into account the number of pulses counted for that time slot in every week since the controller 16 was started, but with the pulses counted in one particular week being given twice as much weight as the pulses counted in the preceding week. In this simple example of operation, during the first week of operation of the controller 16, during the first day the value which is stored for each time slot is simply be the number of pulses counted during that time slot, and those values are then copied over to the corresponding time slot for the same time periods in each of the remaining six days of the week, and the values for those time slots are then updated as the week progresses. This feature takes advantage of an expectation that there will typically be a strong correlation between water usage from one day to the next.

Figure 3:
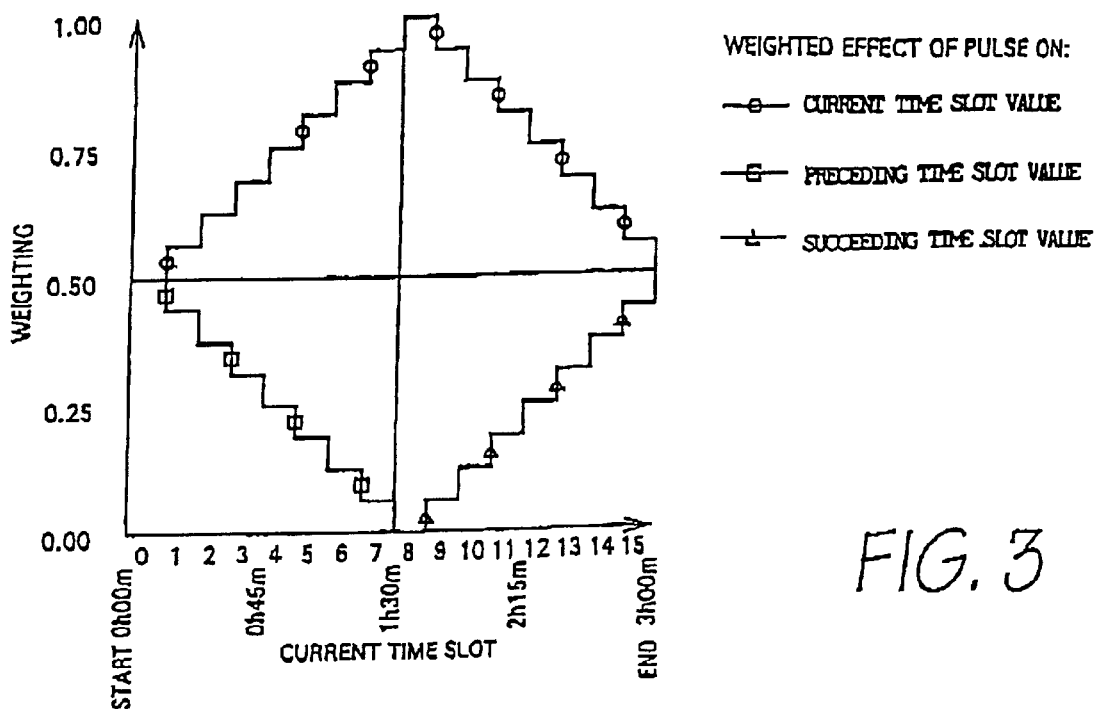
FIGS. 3 & 4 are diagrams which illustrates different weighting effects of the use of an elementary amount of water on the stored values of water usage for the current, preceding and succeeding time slots.

In a modification to the simple example of operation described above, each pulse from the sensor 38 is weighted in dependence upon its temporal offset from the centre of the current time slot. Also, some pulses from the preceding time slot and the succeeding time slot are used in determining the value for the current time slot. This can be used to avoid the potential situation of small changes in the time that water is used having a large effect on the usage pattern. In particular, FIG. 3 shows an example of the weighting effect given to a pulse on the current time slot value, the preceding time slot value and the succeeding time slot value. As mentioned above, each time slot may be divided into 16 time divisions (0 to 15). In division 0, a weighting of 0.5 (⁸⁄₁₆) is given to the pulse for the current time slot value, and a weighting of 0.5 (⁸⁄₁₆) is also given to the pulse for the preceding time slot value. For each succeeding time division, these weightings are increased and decreased, respectively, by 1/16 until time division 8, where a weighting of 1 is given to the pulse for the current time slot value and a weighting of 0 is given to the pulse for the preceding time slot value. In division 9, a weighting of 15/16 is given to the pulse for the current time slot value, and a weighting of 1/16 is given to the pulse for the succeeding time slot value. For each succeeding time division, these weightings are decreased and increased, respectively, by 1/16 until time division 15, where a weighting of 9/16 is given to the pulse for the current time slot value and a weighting of 7/16 is given to the pulse for be succeeding time slot value. It should be noted that for any of the time divisions, the total of the weightings used for the current time slot value, preceding time slot value and succeeding time slot value is always unity. From the above, it will be appreciated that the RAM 42 stores what is effectively a smoothed histogram of the water usage over a period of one week, with greater weighting being given to more recent measurements of the water usage.

Figure 4:
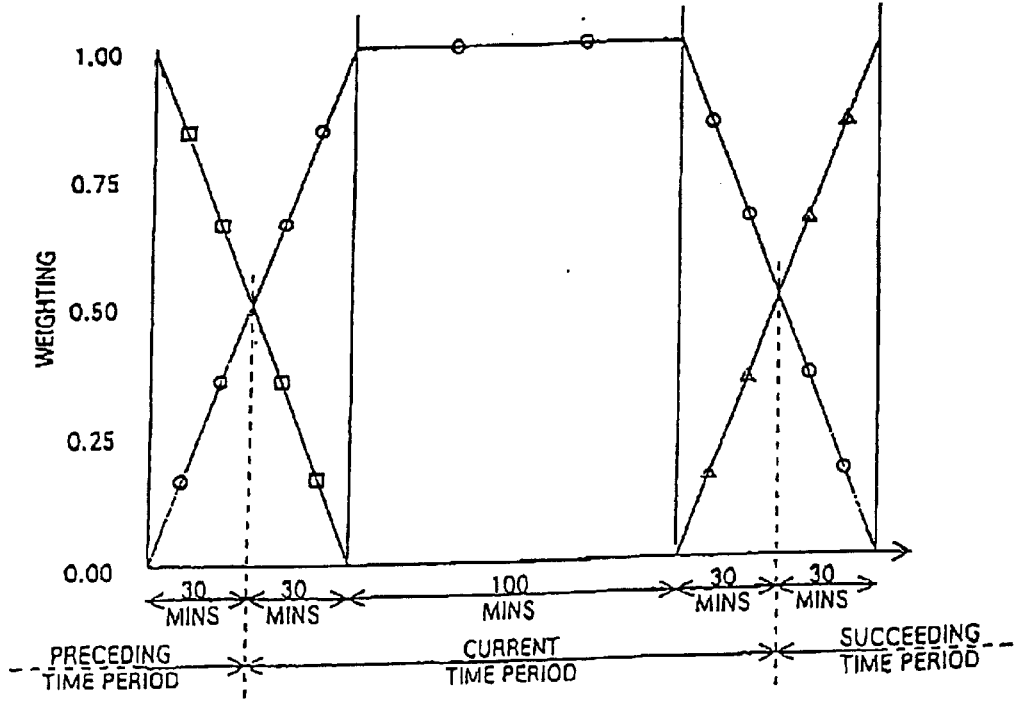

FIG. 4 shows a modified weighting effect. (For clarity, the digital quantisation of the weightings is not shown.) In FIG. 4, the period of each time slot is 160 minutes. Over the first 30 minutes of the current time slot, the weighting effect of each pulse on the current time slot value increases progressively from 0.5 to 1.0, and the weighting effect of each pulse on the preceding time slot value progressively decreases from 0.5 to 0.0. During the middle of 100 minutes of the current time slot, the weighting effect of each pulse on the current time slot value is 1.0, and on the preceding and succeeding time slot values is 0.0. Over the last 30 minutes of the current time slot, the weighting effect of each pulse on the current time slot value decreases progressively from 1.0 to 0.5, and the weighting effect of each pulse on the succeeding time slot value progressively increases from 0.0 to 0.5. The gradients of the slopes and consequently the extent of the plateau may be varied as appropriate.

In addition, the microcontroller 40 also stores in a memory location in the RAM 42 the total number $P_{TOT}$ of pulses from the water flow sensor 38 since a regeneration operation was last carried out. Furthermore, the microcontroller 40 stores in the EEPROM 43 a value $P_{MAX}$ corresponding to the total number of pulses for which it can be predicted that the water softener is in total need of regeneration. This value can be entered when the controller 16 is first set up or can be calculated from other parameters at that time, such as the size and type of water softener and an input indication of the hardness of the water.

The microcontroller 40 serves to compare the values $P_{TOT}$ and $P_{MAX}$ to determine when regeneration is necessary and then to analyse the usage histogram data to determine the best time to start the regeneration process. In particular, while in the SERVICE state, the microcontroller 40 monitors whether $P_{TOT}$ is greater than 75% of $P_{MAX}$ and if so it then waits until the time slot for which the curve of the usage histogram data is at a mathematical minimum, and then initiates a full regeneration process. Alternatively, or additionally, in this case, the microcontroller 40 could wait until the time slot for which the current usage histogram data is a minimum, and then initiate a full regeneration process. In case the usage of water is so great that the capacity of the softener becomes almost exhausted before the required time arrives, the microcontroller 40 may also monitor whether $P_{TOT}$ is greater than 90% of $P_{MAX}$ and if so wait until the current water usage rate is less than a predetermined value (or zero) and then initiate a partial regeneration process. In order to deal with holidays and the like, the microcontroller 40 may also monitor the time since the last regeneration process, and if the time exceeds a predetermined value, such as four days, it may then wait until the current water usage rate is less than a predetermined value (or zero) and then initiate a partial regeneration process.

In an alternative mode of operation, a suitable period for regeneration is determined so as to minimise the volume of hot water that is used during the regeneration must maximising the utilisation of the resin beads 18. Hence, a suitable period is one in which there is little remaining capacity of the resin beads 18, and the predicted water usage is below. A score is calculated for the current time slot as a weighted sum of the remaining capacity and the predicted water usage. The weightings are programmable and can be adjusted to give increased importance to finding a period with little remaining capacity (maximising efficiency) or one with low water usage (minimising usage of hot water). The optimum is a compromise between these two parameters.

For the current time slot, the remaining capacity is known, $P_{MAX}-P_{TOT}$. The water usage for that time slot is predicted from the appropriate stored value for that time slot. The remaining capacity and the predicted water usage are combined as described above to give a score for the current time slot. The remaining capacity for the next time slot is estimated by subtracting the predicted water usage for the current time slot from the current remaining capacity. The water usage for the next time slot is predicted from the appropriate stored value for that time slot. The remaining capacity and the predicted water usage for the next time slot are combined, again as described above, to give a score for the next time slot. This is repeated over nine consecutive time slots (one day). If the remaining capacity for a particular time slot is predicted as less than zero, then the score for that time slot is set to zero. That one of the nine time slots which has the lowest score indicates the best time for regeneration as predicted at the current time. If the current time slot has the lowest score, then a regeneration is initiated. If the current time slot does not have the lowest score, then a regeneration is not initiated, and the above process is repeated once the next time slot is reached.

Once a decision has been made to initiate a regeneration, the apparatus decides whether to perform a full or a partial regeneration. If there is still a significant capacity remaining, then a full regeneration will waste salt. If the predicted water usage is high, then a full regeneration, taking longer than a partial regeneration, will allow more hard water to be used. A full regeneration is performed if the remaining capacity is less than a set, but programmable, threshold AND the predicted water usage is less than a set, but programmable, threshold, otherwise a partial regeneration is performed.

The microcontroller 40 may also be operable to initiate a regeneration process immediately if the user presses a particular key on the keypad 56.

Having described a specific embodiments and example of the invention, it will be appreciated that many modifications and developments may be made in keeping with the invention.

What is claimed is:

1. A method of controlling recharging of a water conditioning apparatus, comprising the steps of: measuring water usage by the apparatus; storing for each time slot of a cyclically repeating series of said time slots a value dependent upon an average of the measured amounts of usage in that time slot and in at least one corresponding time slot in a previous cycle; and determining, at least in part, a time for recharging the apparatus in dependence upon the stored values.

2. A method as claimed in claim 1, wherein when the value for each time slot is updated, its new value is calculated as the arithmetic mean of the measured amount during the time slot which has just elapsed and the value previously stored for that time slot.

3. A method as claimed in claim 1 or 2, further comprising the step of detecting a parameter from which a requirement to recharge the apparatus can be determined or predicted.

4. A method as claimed in claim 3, wherein, in the determining step, the current time slot is determined to be said time for recharging the apparatus if both (a) the stored value for the current time slot is a minimum compared with that for adjacent time slots and (b) the requirement parameter is in a first predetermined requirement range.

5. A method as claimed in claim 3, wherein, in the determining step, the current time slot is determined to be said time for recharging the apparatus if both (a) the stored value for the current time slot is the minimum of the stored values for all of the time slots and (b) the requirement parameter is in a second predetermined requirement range.

6. A method as claimed in claim 3, wherein, in the determining step, the current time slot is determined to be said time for recharging the apparatus if both (a) the measured water usage for the current time slot is less than a first predetermined usage value or is zero and (b) the requirement parameter is in a third predetermined requirement range.

7. A method as claimed in claim 1 or 2, wherein the determining step comprises the steps of: determining a score for the current time slot in dependence upon a predicted remaining capacity of the apparatus for the current time slot and upon the stored value for the current time slot; determining at least one further score for at least one respective subsequent time slot in dependence upon a predicted remaining capacity of the apparatus for that subsequent time slot and the stored value for that subsequent time slot; and determining whether or not to initiate recharging of the apparatus in the current time slot in dependence upon a comparison of the determined scores.

8. A method as claimed in claim 7, wherein the predicted remaining capacity for the or each subsequent time slot is determined from the predicted remaining capacity for the current time slot, the stored value for the current time slot and the stored value for any time slot between the current time slot and that subsequent time slot.

9. A method as claimed in claim 7, wherein such scores are determined for the time slots covering a period of one day.

10. A method as claimed in claim 7, further comprising the steps, if it is determined to recharge the apparatus, of determining whether to make a full recharge or a partial recharge of the apparatus in dependence upon the predicted remaining capacity for the current time slot and the stored value for the current time slot.

11. A method as claimed in claim 1, wherein, in the determining step, the current time slot is determined to be said time for recharging the apparatus if both (a) the measured water usage for the current time slot, or at the current time, is less than a second predetermined value or is zero and (b) the period of time since the previous recharging of the apparatus is more than a first predetermined time period.

12. A method as claimed in claim 1, wherein the stored value for each time slot is dependent upon measured elementary amounts of usage in that time slot and at least one temporally adjacent time slot, each elementary amount being weighted in dependence upon the temporal offset between the time of occurrence of that elementary amount of usage and a predetermined point in time relative to that time slot.

13. A method as claimed in claim 1, wherein the stored value for each time slot is dependent upon an average of the currently measured amount of usage in that time slot and the stored value for the previous time slot which the current time slot repeats.

14. A recharging controller for a water conditioning apparatus, the recharging controller comprising input means for receiving measurements of water usage by the apparatus; storing means configured to store, for each time slot of a cyclically repeating series of said time slots, a value dependent upon an average of the measured amounts of usage in that time slot and in at least one corresponding time slot in a previous cycle; and determining means configured to determine, at least in part, a time for recharging the apparatus in dependence upon the stored values.

15. A water conditioning apparatus having a controller as claimed in claim 14.

\* \* \* \* \*